(12) United States Patent
Steenburgh et al.

(10) Patent No.: US 6,655,409 B1
(45) Date of Patent: Dec. 2, 2003

(54) COMBINED STOP AND CONTROL VALVE FOR SUPPLYING STEAM

(75) Inventors: John Howard Steenburgh, Amsterdam, NY (US); Roger Bennett Clark, Scotia, NY (US); Nicholas Dundas Porteous, Duanesburg, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/233,606

(22) Filed: Sep. 4, 2002

(51) Int. Cl.[7] ............................................... F16K 11/20
(52) U.S. Cl. ........................ 137/614.19; 137/630.14; 137/630.15
(58) Field of Search ................... 137/614.19, 614.18, 137/614.17, 614.16, 637.2, 637, 613, 630.14, 630.15

(56) References Cited

U.S. PATENT DOCUMENTS 4,114,652 A * 9/1978 Oberle ................... 137/613 X
4,481,776 A * 11/1984 Araki et al. ........ 137/614.19 X
6,070,605 A 6/2000 Steenburgh

* cited by examiner

Primary Examiner—Kevin Lee
(74) Attorney, Agent, or Firm—Nixon & Vanderhye

(57) ABSTRACT

The steam valve includes a fast-acting control valve and stop valve acting against a valve seat in a steam flow passage in a closed position. An outlet passage below the valve seat has transition walls therebetween, affording a smooth, continuous flow past the seat into an outlet whereby head losses are reduced. An annular screen about the valve has support structure recessed in the walls of the inlet to reduce flow blockage and vortex formation. A balance chamber disposed above the control valve has a bleed hole for equalizing steam pressure in the balance chamber and steam valve which inhibits depressurization of the balance chamber and facilitates fast closing of the control valve. Buttress threads interconnect the control valve stem and the control valve head to preclude binding of those parts due to oxide buildup.

10 Claims, 2 Drawing Sheets

COMBINED STOP AND CONTROL VALVE FOR SUPPLYING STEAM

BACKGROUND OF THE INVENTION

The present invention relates to steam inlet valves and particularly relates to a combined control valve and stop valve constructed to provide optimum flow characteristics with a balance chamber and inlet bleed for enabling fast closure of the control valve.

In a typical steam turbine control valve, for example, of the type described and illustrated in U.S. Pat. No. 6,070,605, the disclosure of which is incorporated herein by reference, there is provided a steam inlet valve incorporating a control or interceptor valve and a main stop valve or reheat stop valve, hereafter called control valve and stop valve, respectively. The control valve is generally annular and has margins for seating against the annular valve seat in a closed condition of the control valve. A servo-valve typically positions the control valve relative to the valve seat to control the flow through the steam inlet. The stop valve includes a disk disposed within the annular space of the control valve and underlies the control valve.

As noted in the above-identified patent, the stop valve generally follows the movement of the control valve such that the sealing surfaces of the control valve and the underside of the stop valve provide a relative smooth flowpath for steam flow past the combined control and stop valves when the main stop valve is in an open condition. The principal purpose of the stop valve, however, is to close the steam inlet valve rapidly in response to a fast close signal to rapidly cut off the flow of steam through the steam inlet valve. The stop valve is controlled from below the inlet through a hydraulic cylinder, the fluid for which can be dumped quickly, enabling the stop valve to rapidly close against the seat. There is a need, however, for flow improvements to further reduce head losses and to facilitate fast closing of the control valve.

BRIEF DESCRIPTION OF THE INVENTION

In accordance with a preferred embodiment of the present invention, there is provided a steam inlet valve for supplying steam to downstream steam machinery and wherein the valve has smooth continuous walls joining a steam outlet and valve seat free of vortices, thereby improving flow performance through the valve. Particularly, the outlet passage below the valve seat and in communication with the outlet of the steam inlet valve forms a smooth continuous transition with the valve seat, substantially maintaining the cross-sectional flow area. By this construction, an enlarged chamber below the valve seat is entirely eliminated. Moreover, the minimum changes in flow area reduce velocity head losses through the valve. In addition, an annular strainer is provided upstream of and about the control and stop valves, the margins of the strainer being recessed in grooves about the valve seat. In this manner, substantially only the strainer and none of its mounting structure is exposed in the flow of steam toward the valve seat which further eliminates abrupt changes in flow direction and consequent head losses.

In a further preferred embodiment of the present invention, there is provided a balance chamber above the control valve which has a bleed hole. When the control valve is signaled to fast-close the steam inlet, the bleed hole equalizes the pressure between the steam flowing past the valve and the steam in the balance chamber. This minimizes or eliminates a lowering of the pressure in the balance chamber which might otherwise tend to inhibit the movement of the control valve toward the valve seat. Additionally, buttress-type threads are interconnected between the control valve and the control valve stem. By using threads of this type, oxide buildup in service is unavoidably permitted, but the buildup is insufficient to cause the threads to bind and lock with one another. The valve is particularly useful for supplying steam to a steam turbine.

In a preferred embodiment according to the present invention, there is provided a valve for supplying steam to downstream machinery, comprising a generally annular valve seat defining a steam flow passage, a control valve in the passage including a control valve head having a recess on a downstream side of the control valve, the control valve head being movable toward and away from the valve seat, a stop valve having a stop valve head generally within the recess and a sealing surface for engagement with the valve seat in a stop valve closed position, an outlet passage below the valve seat and in communication with an outlet for directing the supply of steam to the machinery, the outlet passage and the valve seat having walls forming a smooth continuous transition therebetween without abrupt changes in flow direction for directing supplied steam past the seat, through the outlet passage and to the outlet substantially without formation of vortices to afford optimum steam flow characteristics with minimum losses.

In a further preferred embodiment according to the present invention, there is provided a valve for supplying steam to a steam turbine, comprising a generally annular valve seat defining a steam flow passage, a control valve in the passage including a control valve head having a recess on a downstream side of the control valve, the control valve head being movable toward and away from the valve seat, a stop valve having a stop valve head generally within the recess and a sealing surface for engagement with the valve seat in a stop valve closed position, an outlet passage below the valve seat and in communication with an outlet for directing the supply of steam to the turbine, a steam balance chamber above the control valve head defined in part by one side of the control valve head and which enlarges in response to movement of the control valve head toward the valve seat, and a bleed aperture in the control valve in communication with the balance chamber for precluding depressurization of the balance chamber in response to movement of the control valve head toward the valve seat.

In a further preferred embodiment according to the present invention, there is provided a valve for supplying steam to a steam turbine, comprising a generally annular valve seat defining a steam flow passage, a control valve in the passage including a control valve head having a recess on a downstream side of the control valve, the control valve head being movable toward and away from the valve seat, a stop valve having a stop valve head generally within the recess and a sealing surface for engagement with the valve seat in a stop valve closed position, an outlet passage below the valve seat and in communication with an outlet for directing the supply of steam to the turbine, including a valve stem coupled between the control valve head and an actuator for moving the control valve head toward the valve seat and buttress threads coupling the valve stem and the control valve head to one another.

BRIEF DESCRIPTION OF THE;DRAWINGS

DETAILED DESCRIPTION OF THE INVENTION

Figure 1:
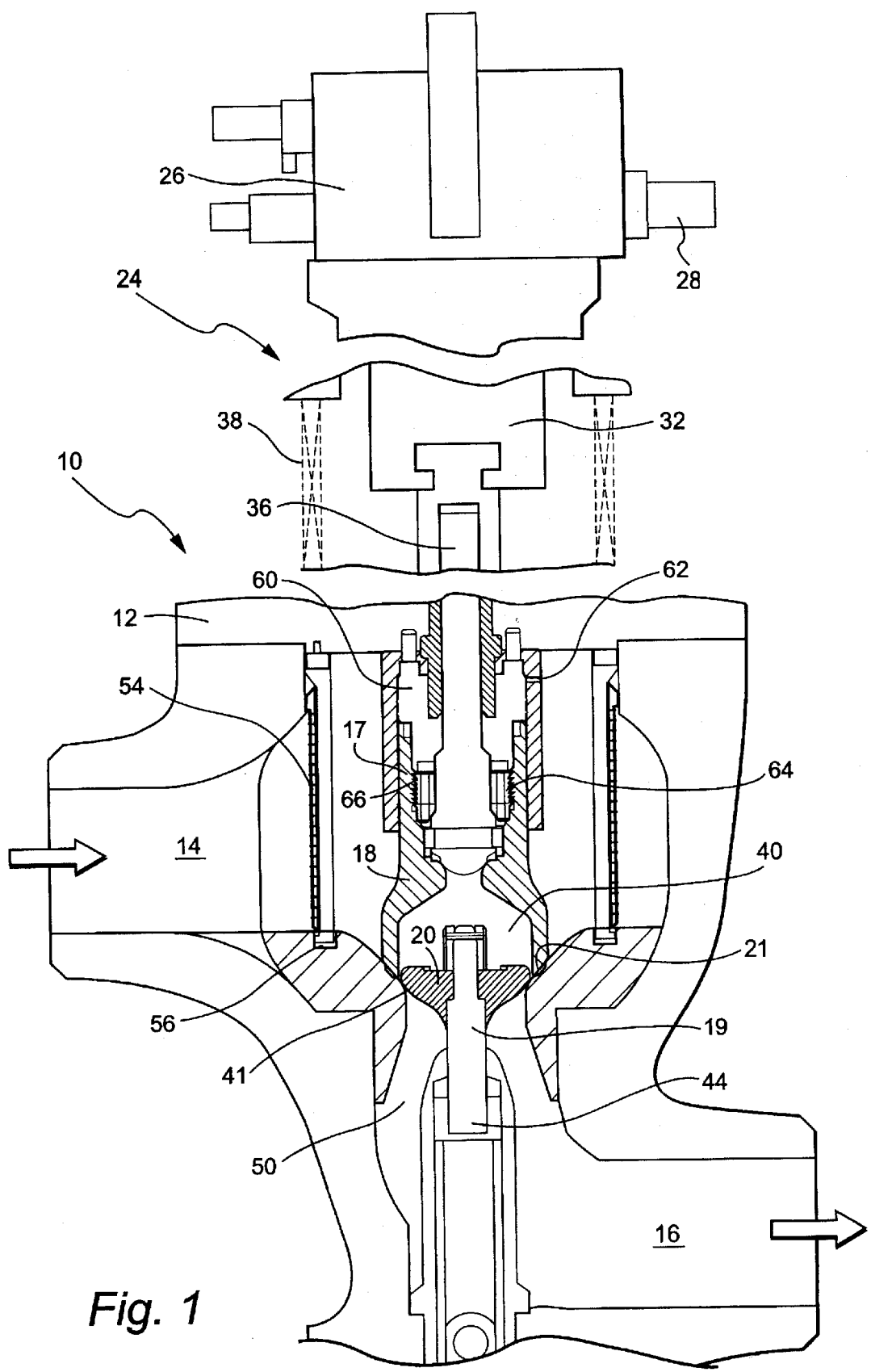
FIG. 1 is a fragmentary schematic elevational view with portions broken out of a steam valve constructed in accordance with a preferred embodiment of the present invention.
Figure 2:
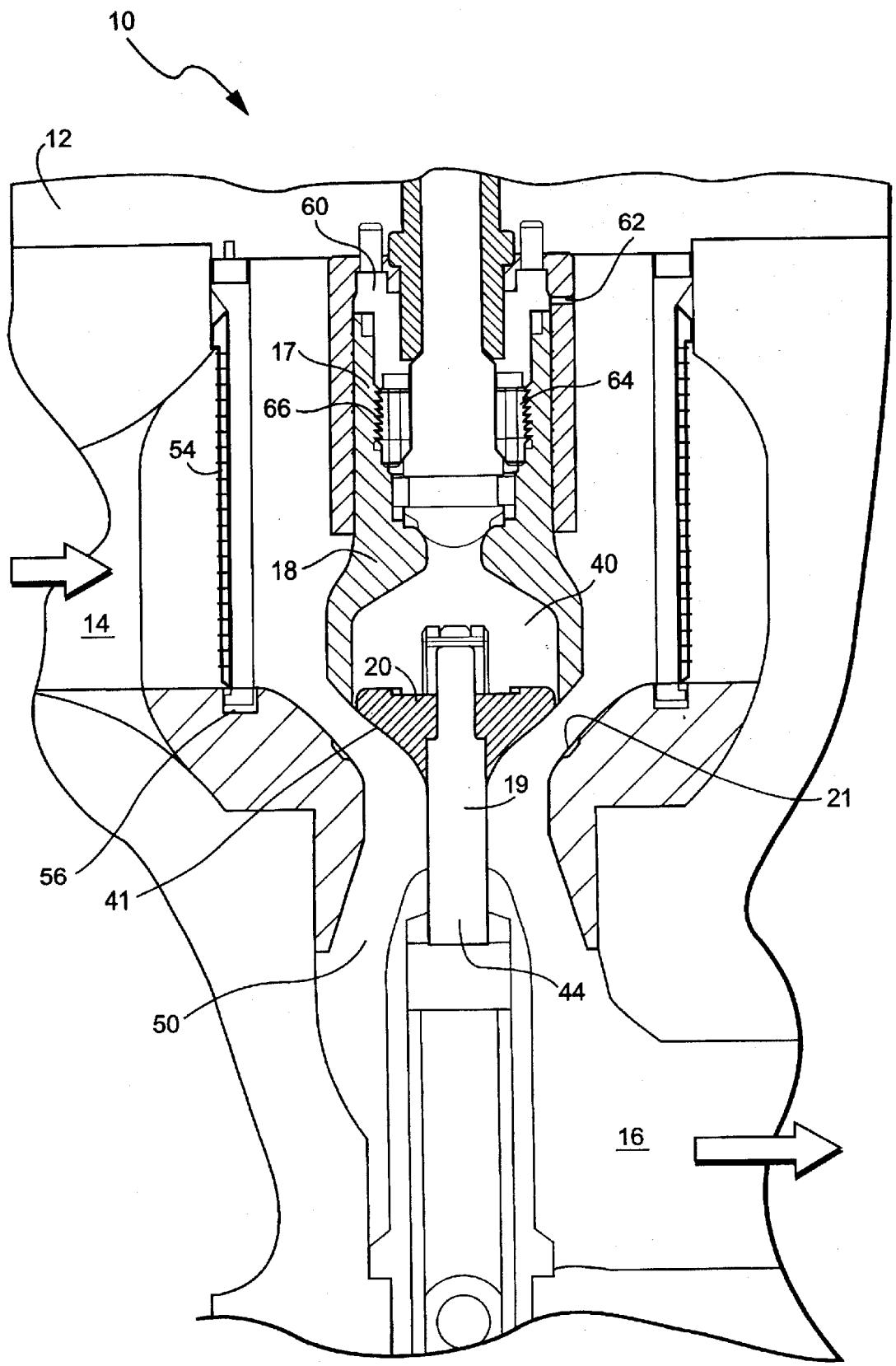
FIG. 2 is an enlarged fragmentary cross-sectional view illustrating the flow control valve and stop valve in a valve-open position.

Referring now to FIG. 1, there is illustrated a steam valve, generally designated 10, having a steam valve body 12, a steam inlet 14, a steam outlet 16, a control valve 17 including a control valve head 18, and a stop valve 19 including a stop valve head 20. Above control valve 18, there is provided a control valve actuator, generally designated 24, including a hydraulic cylinder 26 under the control of a servo-valve 28. The cylinder is connected to a cross head 32, in turn coupled to a stem 36 for raising and lowering the valve head 18 of the control valve 17. Springs 38 are employed to fast-close the control valve 17 when hydraulic fluid is dumped from the cylinder 26 upon receiving a fast-close signal from a steam valve control system, not shown. It will be appreciated that by using servo-valve 28, the position of the flow control head 18 relative to the valve seat 21 can be controlled in response to load changes on the turbine.

The control head 18 is annular in configuration, having a hollow or recess 40 along its underside. The annular lower edge of control valve head 18 in a closed position engages and seals against the valve seat. The stop valve head 20 is configured for reception within the recess 40 and also includes an annular surface 41 about its underside for sealing and engaging against the valve seat 21 in a stop valve closed position. The stop valve head 20 is mounted on a shaft or stem 44 which extends through suitable packing to a hydraulic cylinder. As in the above-mentioned U.S. Pat. No. 6,070,605, the stop valve head 20 follows the movement of the control valve head 18 through a control system disclosed in that prior patent. By following the movement of the control valve, the combination of the control valve head 18 and stop valve head 20 provide a smooth, laminar flow of steam past those heads and through the valve to the outlet 16. For details of the operation of the control valve and stop valve, reference is made to U.S. Pat. No. 6,070,605, incorporated herein by reference.

Below the stop valve head 20, there is provided an outlet passage 50 which directs the flow of steam passing through the valve to the outlet 16. The outlet passage 50 and the valve seat have walls substantially forming a smooth, continuous transition therebetween without any abrupt changes in flow direction. In this manner, the steam flowing through the valve past the valve seat and through the outlet passage to the outlet is substantially without vortices and affords optimum steam flow characteristics, with minimum losses. Moreover, the outlet passage 50 has a cross-sectional area which is not substantially larger than the cross-sectional area of the valve seat 21 and the outlet 16. Thus, the pattern of steam flow in the valve-open condition tends toward a laminar flow without substantial vortices and, consequently, with minimum head losses.

As illustrated in FIG. 1, an annular screen 54 is also provided about the control valve 17 and stop valve 19. The annular screen 54 has margins 56 which are recessed in grooves formed in the walls of the inlet 14. In this manner, the support structure for the screen is recessed out of the way, of the steam flowpath and hence the steam flows through the annular screen without any obstruction from the screen support structure.

The steam flow valve hereof also includes a balance chamber 60 about the stem 36, coupled to the control valve head 18. It will be appreciated that the volume of the balance chamber 60 which is in part defined by the control valve 17 changes as the control valve is displaced toward its opened and closed positions. It is important for a fast close of the control valve head 18 that any drag imposed on the valve during fast-closing motion be minimized or eliminated. Thus, because the volume of the balance chamber 60 increases as the control valve head is displaced toward the valve seat, a bleed aperture or inlet hole 62 lies in communication with the balance chamber 60 and with the steam flowing through the steam valve. The inlet hole 62 enables an equalization of the pressure in the balance chamber with the inlet flow of steam during movement of the control valve 17. Thus, as the control valve is displaced toward the seat upon fast-closing, and the volume of the balance chamber 60 increases, the equalization of the pressure in the balance chamber and steam inlet flow precludes or minimizes a depressurization of the balance chamber which might otherwise inhibit movement of the control valve head 18 toward the valve seat 21.

One of the many problems associated with steam valves is the buildup of oxides over time during use. It will be appreciated that the steam valves are disassembled and assembled after periods of use, for example, on the order of three to five years, so that various parts can be inspected, reworked and/or replaced, as necessary. Oxide buildup frequently causes substantial difficulties in disassembling the various parts of the valve. One area where this has become a particular problem is the connection between the control valve stem and the control valve head. The valve stem 36 is coupled to the control valve 17 by a bolted collar 64, threaded to female threads on the control valve. Buildup of oxides on these threads renders the decoupling of the stem and control valve very difficult. In accordance with a preferred embodiment of the present invention, however, buttress-type threads are utilized between the stem collar and the control valve. Buttress-type threads 66 provide a clearance on the back side of the threads, affording room for oxide buildup, but preclude oxide buildup to the point where the threads would bind, preventing disconnection of the valve stem and the control valve.

While the invention has been described in connection with what is presently considered to be the most practical and preferred embodiment, it is to be understood that the invention is not to be limited to the disclosed embodiment, but on the-contrary, is intended to cover various modifications and equivalent arrangements included within the spirit and scope of the appended claims.

What is claimed is:

1. A valve for supplying steam to downstream machinery, comprising:

a generally annular valve seat defining a steam flow passage;

a control valve in said passage including a control valve head having a recess on a downstream side of said control valve, said control valve head being movable toward and away from said valve seat between closed and open positions, respectively;

a stop valve having a stop valve head generally within said recess and a sealing surface for engagement with said valve seat in a stop valve closed position downstream of said control valve closed position;

an outlet passage below said valve seat and in communication with an outlet for directing the supply of steam to the machinery, said outlet passage having a cross-sectional area not substantially larger than the cross-sectional area of the valve seat and said outlet, said outlet passage and said valve seat having walls forming a smooth continuous transition therebetween without abrupt changes in flow direction for directing supplied steam past said seat, through said outlet passage and to said outlet generally in a laminar flow condition substantially without formation of vortices to afford optimum steam flow characteristics with minimum losses.

2. A valve according to claim 1 wherein said outlet lies generally at right angles to the direction of steam flow past said valve seat.

3. A valve according to claim 2 including a screen about said control valve, structural margins of said screen being recessed within an inlet passage to the valve and located between the inlet and the valve seat whereby the structural margins of the screen are recessed out of the flowpath.

4. A valve according to claim 1 including a steam balance chamber above said control valve head defined in part by one side of said control valve head and which enlarges in response to movement of said control valve head toward said valve seat, and a bleed aperture in said control valve in communication with said balance chamber for precluding depressurization of the balance chamber in response to movement of said control valve head toward said valve seat.

5. A valve according to claim 4 including an inlet passage to the valve for flowing steam through the valve, said bleed aperture lying in communication with said inlet passage.

6. A valve for supplying steam to downstream machinery, comprising:
   a generally annular valve seat defining a steam flow passage;
   a control valve in said passage including a control valve head having a recess on a downstream side of said control valve, said control valve head being movable toward and away from said valve seat;
   a stop valve having a stop valve head generally within said recess and a sealing surface for engagement with said valve seat in a stop valve closed position;
   an outlet passage below said valve seat and in communication with an outlet for directing the supply of steam to the machinery, said outlet passage and said valve seat having walls forming a smooth continuous transition therebetween without abrupt changes in flow direction for directing supplied steam past said seat, through said outlet passage and to said outlet substantially without formation of vortices to afford optimum steam flow characteristics with minimum losses;
   a valve stem coupled between said control valve and an actuator for moving said control valve toward said valve seat and buttress threads coupling said valve stem and said control valve head to one another.

7. A valve for supplying steam to a steam turbine, comprising:
   a generally annular valve seat defining a steam flow passage;
   a control valve in said passage including a control valve head having a recess on a downstream side of said control valve, said control valve head being movable toward and away from said valve seat;
   a stop valve having a stop valve head generally within said recess and a sealing surface for engagement with said valve seat in a stop valve closed position;
   an outlet passage below said valve seat and in communication with an outlet for directing the supply of steam to the turbine, a steam balance chamber above said control valve head defined in part by one side of said control valve head and which enlarges in response to movement of said control valve head toward said valve seat, and a bleed aperture in said control valve in communication with said balance chamber for precluding depressurization of the balance chamber in response to movement of said control valve head toward said valve seat;
   a valve stem coupled between said control valve and an actuator for moving said control valve head toward said valve seat and buttress threads coupling said valve stem and said control valve head to one another.

8. A valve according to claim 7 including a screen about said control valve, margins of said screen being recessed within an inlet passage to the valve and located between the inlet and the valve seat whereby the structural margins of the screen are recessed out of the flowpath, a valve stem coupled between said control valve head and an actuator for moving said control valve head toward said valve seat and buttress threads coupling said valve stem and said control valve head to one another.

9. A valve for supplying steam to a steam turbine, comprising:
   a generally annular valve seat defining a steam flow passage;
   a control valve in said passage including a control valve head having a recess on a downstream side of said control valve, said control valve head being movable toward and away from said valve seat;
   a stop valve having a stop valve head generally within said recess and a sealing surface for engagement with said valve seat in a stop valve closed position;
   an outlet passage below said valve seat and in communication with an outlet for directing the supply of steam to the turbine, including a valve stem coupled between said control valve head and an actuator for moving said control valve head toward said valve seat and buttress threads coupling said valve stem and said control valve head to one another.

10. A valve according to claim 9 including a steam balance chamber above said control valve head defined in part by one side of said control valve and which enlarges in response to movement of said control valve head toward said valve seat, and a bleed aperture in said control valve in communication with said balance chamber for precluding depressurization of the balance chamber in response to movement of said control valve head toward said valve seat.

* * * * *